(12) United States Patent
Nishihara et al.

(10) Patent No.: US 8,952,793 B2
(45) Date of Patent: Feb. 10, 2015

(54) BICYCLE ELECTRICAL SYSTEM

(75) Inventors: Taihei Nishihara, Osaka (JP); Takafumi Suzuki, Osaka (JP); Shun Kou, Osaka (JP)

(73) Assignee: Shimaro Inc., Osaka (JP)

( * ) Notice: Subject to any disclaimer, the term of this patent is extended or adjusted under 35 U.S.C. 154(b) by 385 days.

(21) Appl. No.: 13/047,979

(22) Filed: Mar. 15, 2011

(65) Prior Publication Data
US 2011/0267178 A1 Nov. 3, 2011

(30) Foreign Application Priority Data
Apr. 28, 2010 (JP) ................................. 2010-104568

(51) Int. Cl.
*G08C 19/16* (2006.01)
*H02J 13/00* (2006.01)
(Continued)

(52) U.S. Cl.
CPC .............. *H02J 13/0003* (2013.01); *B62K 23/02* (2013.01); *B62K 23/06* (2013.01); *B62M 25/08* (2013.01);
(Continued)

(58) Field of Classification Search
CPC ..................... H02J 13/0024; H04B 2203/5433; H04B 2203/5458; H04B 3/54; Y02E 60/7823; Y02E 60/7892; Y04S 40/122; Y04S 40/146
USPC ........ 340/12.32–39, 13.23, 432, 538, 538.11, 340/538.17; 307/1–8, 9.1–10.1, 10.2, 10.6, 307/10.8; 482/8; 375/257
See application file for complete search history.

(56) References Cited

U.S. PATENT DOCUMENTS 4,788,527 A * 11/1988 Johansson .................... 340/10.2
5,424,709 A    6/1995 Tal
(Continued)

FOREIGN PATENT DOCUMENTS

DE    199 06 095 A1    8/2000
EP    1 357 678 A1    10/2003
(Continued)

OTHER PUBLICATIONS

European Search Report of corresponding EP Application No. 11 16 2919.2 dated Jun. 11, 2012.

*Primary Examiner* — Benjamin C Lee
*Assistant Examiner* — Chico A Foxx
(74) *Attorney, Agent, or Firm* — Global IP Counselors

(57) ABSTRACT

A bicycle electrical system is provided with a first electric component, a second electric component, and a third electric component. The first electric component includes a first electric power line communication section. The second electric component includes a second electric power line communication section. The third electric component includes a third electric power line communication section. The first and second electric power line communication sections are connected with a first electric power line such that the first and second electric power line communication sections conduct communications via the first electric power line. The second and third electric power line communication sections are connected with a second electric power line such that the second and third electric power line communication sections conduct communications via the second electric power line.

19 Claims, 11 Drawing Sheets

(51) Int. Cl.
*B62K 23/02* (2006.01)
*B62K 23/06* (2006.01)
*B62M 25/08* (2006.01)
*H04B 3/54* (2006.01)
*B60L 1/14* (2006.01)
*B60L 7/14* (2006.01)
*B60L 7/26* (2006.01)
*B60L 11/00* (2006.01)
*B60L 11/18* (2006.01)
*B60L 15/20* (2006.01)
*B62M 25/00* (2006.01)

(52) U.S. Cl.
CPC . *H04B 3/544* (2013.01); *B60L 1/14* (2013.01); *B60L 7/14* (2013.01); *B60L 7/26* (2013.01); *B60L 11/007* (2013.01); *B60L 11/1803* (2013.01); *B60L 11/1861* (2013.01); *B60L 11/1877* (2013.01); *B60L 15/2009* (2013.01); *B60L 15/2054* (2013.01); *B62M 2025/003* (2013.01); *H04B 2203/5412* (2013.01); *H04B 2203/5458* (2013.01); *H04B 2203/547* (2013.01); *B60L 2200/12* (2013.01); *B60L 2240/12* (2013.01); *B60L 2240/421* (2013.01); *B60L 2240/423* (2013.01); *B60L 2250/12* (2013.01); *B60L 2250/16* (2013.01); *B60L 2250/24* (2013.01)
USPC .............. 340/12.39; 340/12.32; 340/12.33; 340/12.34; 340/12.35; 340/12.36; 340/12.37; 340/12.38; 340/13.23; 340/432; 340/538.11; 340/538.17; 307/1; 307/2; 307/3; 307/4; 307/5; 307/6; 307/7; 307/8; 307/9.1; 307/10.1; 307/10.2; 307/10.6; 307/10.8; 482/8; 375/257

(56) References Cited

U.S. PATENT DOCUMENTS

| | | |
|---|---|---|
| 5,483,137 A | 1/1996 | Fey et al. |
| 5,952,914 A | 9/1999 | Wynn |
| 5,986,539 A * | 11/1999 | Johansson et al. ............ 370/535 |
| 6,835,069 B2 | 12/2004 | Kitamura et al. |
| 7,132,927 B2 * | 11/2006 | Rapaich ........................ 713/300 |
| 7,509,176 B2 * | 3/2009 | Chen ................................. 700/1 |
| 2003/0195668 A1 | 10/2003 | Radtke et al. |
| 2003/0197480 A1 * | 10/2003 | Kitamura ....................... 318/34 |
| 2004/0108683 A1 | 6/2004 | Oohara |
| 2004/0115962 A1 * | 6/2004 | Kitamura et al. .............. 439/34 |
| 2005/0040709 A1 * | 2/2005 | Enders et al. ................ 307/10.1 |
| 2006/0061329 A1 | 3/2006 | Dawson |
| 2012/0011388 A1 * | 1/2012 | Katou ............................ 713/340 |
| 2012/0210821 A1 * | 8/2012 | Carlini ........................ 74/551.8 |

FOREIGN PATENT DOCUMENTS

| | | |
|---|---|---|
| EP | 1 394 031 A2 | 3/2004 |
| FR | 2 882 483 A1 | 8/2006 |
| JP | 10-91243 A | 4/1998 |
| JP | 2003-312570 A | 11/2003 |

\* cited by examiner

BICYCLE ELECTRICAL SYSTEM

CROSS-REFERENCE TO RELATED APPLICATIONS

This application claims priority under 35 U.S.C. §119 to Japanese Patent Application No. 2010-104568, filed Apr. 28, 2010. The entire disclosure of Japanese Patent Application No. 2010-104568 is hereby incorporated herein by reference.

BACKGROUND OF THE INVENTION

1. Field of the Invention

This invention generally relates to an electrical system. More specifically, the present invention relates a bicycle electrical system that can be installed onto a bicycle.

2. Background Information

In recent years, a number of electric components are installed on bicycles. For example, power assisted bicycles have been developed that are configured to supplement a drive force exerted by a rider with an electric motor. Such power assisted bicycles are provided with electric components that are interconnected as a bicycle electrical system. This bicycle electrical system often includes the electric motor, a torque sensor, a rotation sensor, a front lamp, an operating unit and an assistance control unit. If an electric gear changing device is installed, the bicycle will also be provided with an electric unit that includes such components as a motor or other drive device for driving the electric gear changing device and a position sensor for detecting a gear changing position of the electric gear changing device. When multiple electric components are connected, separate signal lines for transmitting control signals are connected to each of the electric components.

One example of a conventional bicycle electrical system is disclosed in Japanese Laid-Open Patent Publication No. 2003-312750. The conventional bicycle electrical system of this publication has two electric components connected with an electric power communication line. This conventional bicycle electrical system also has a control unit provided on a front derailleur and an operating unit provided on a handlebar, and uses an electric power line communication technology to connect the control unit and the operating unit through the electric power line. Other electric components are connected to the control units with signal lines.

SUMMARY

In the conventional bicycle electrical system explained above, the number of signal lines required for transmitting control signals is basically equal to the number of electric components connected to the control unit. Thus, the number of signal lines is large when the number of the electric components is large. Moreover, the signal lines are long if the electric components are arranged in positions far from the control unit. Furthermore, a separate signal line must be connected to each electric component. Consequently, the task of installing the wiring is difficult.

One object of the present disclosure is to provide a bicycle electrical system for which the task of installing wiring is easier.

Another object of the present disclosure is to provide a bicycle electrical system for which the task of installing wiring of an electric component that includes an electric motor is easier.

The foregoing objects can basically be attained by providing

A bicycle electrical system according to a first aspect is basically provided with a first electric component, a second electric component and a third electric component. The first electric component includes a first electric power line communication section. The second electric component includes a second electric power line communication section. The third electric component includes a third electric power line communication section. The first and second electric power line communication sections are connected with a first electric power line such that the first and second electric power line communication sections conduct communications via the first electric power line. The second and third electric power line communication sections are connected with a second electric power line such that the second and third electric power line communication sections conduct communications via the second electric power line.

In this electrical system, each of the first, second and third electric components has an electric power line communication section with which communication can take place through an electric power line. Consequently, control signals can be modulated and superimposed onto electric power transmissions at each of the electric components and the control signals can be decoded from the electric power.

Since each of the first, second and third electric components has an electric power line communication section, so long as a control section is provided in any one of the electric components or a control section is connected to one of the electric components, the wiring can be completed such that a plurality of electric components can be controlled by merely connecting separate electric power lines between the three electric components. Since each of the electric power lines is only connected between two electric components, the length of the wires is shorter. Since the electric power line is a two-wire line, the number of wires is smaller than for a system in which a separate signal line is required for each control signal. Furthermore, electric components having different functions can be connected using the same two-wire power line. Consequently, the task of installing the wiring can be accomplished more easily.

A bicycle electrical system according to a second aspect is provided according to the first aspect, wherein at least one of the first, second and third electric components has a terminal connector that is configured to be connected to an electric power source. With this aspect, electric power can be supplied from the electric component connected to the electric power source to the remaining electric components through the electric power lines.

A bicycle electrical system according to a third aspect is provided according to the first aspect, wherein at least one of the first, second and third electric components has a control section configured to transmit control signals through at least one of the first electric power line and the second electric power line and control the remaining electric components. With this aspect, since one of the three electric components has a control section, the wiring from the electric component having the control section can also be accomplished easily.

A bicycle electrical system according to a fourth aspect is provided according to the third aspect, wherein the first electric component has the control section. In this aspect, the control section is provided in the first electric component, which is located at an end portion. Consequently, by arranging the first electric component an a rear carrier or other end portion of the bicycle, the second electric component and the third electric component can be connected to the first electric component without causing the electric power lines to become complex. As a result, the task of installing the wiring is even easier.

A bicycle electrical system according to a fifth aspect is provided according to the first aspect, wherein the electric power line communication section has an electric power line connecting section configured to be connected to the first electric power line and the second electric power line together. With this aspect, since the electric power line communication section can connect two electric power lines together, the second electric component, for example, can receive a control signal sent from the first electric component through the first electric power line and can send a control signal to the third electric component through the second electric power line.

A bicycle electrical system according to a sixth aspect is provided according to the fifth aspect, wherein the electric power line communication section of the second electric component has at least three electric power line connecting sections. With this aspect, the three electric power lines can be connected at the second electric component, which is arranged in an intermediate position, because the second electric component has three electric power line connecting sections. As a result, another electric component can be connected in addition to the first electric component and the third electric component.

A bicycle electrical system according to a seventh aspect is provided according to the first aspect, wherein a plurality of additional second electric components that corresponds to the second electric component. With this aspect, since a plurality of second electric components are provided in intermediate positions, the first electric component and the third electric component can communicate through at least one of the second electric components.

A bicycle electrical system according to an eighth aspect is provided according to the seventh aspect, wherein the additional second electric components are configured to perform different functions. With this aspect, since the second electric components have different functions and are arranged between the first electric component and the third electric component, second electric components having different functions can be operated by being connected to the first electric component through the first electric power line.

A bicycle electrical system according to a ninth aspect is provided according to the first aspect, wherein a plurality of additional third electric components that corresponds to the third electric component. With this aspect, since a plurality of third electric components are provided in an end position, the first electric component can communicate with the third electric components through the second electric component.

A bicycle electrical system according to a tenth aspect is provided according to the ninth aspect, wherein the additional third electric components are configured to perform different functions. With this aspect, since the third electric components have different functions and are arranged at an end portion, third electric components having different functions can be connected to the second electric component through the a plurality of second electric power lines such that they can operate the first electric component differently.

A bicycle electrical system according to an eleventh aspect is provided according to the third aspect, wherein the second electric component has the control section. With this aspect, the second electric component arranged in an intermediate position has the control section. Consequently, by arranging the second electric component on a bottom bracket shell or other intermediate portion of the bicycle, the first electric component and the third electric component can be connected to the second electric component with short electric power lines and the electric power lines will not become complex. As a result, the task of installing the wiring is even easier.

A bicycle electrical system according to a twelfth aspect is provided according to the fourth aspect, wherein one or a plurality of second electric components is provided, the control section is configured to recognize a connection of the second electric component and of the third electric component. With this aspect, since the control section can recognize a connection of a second electric component and a third electric component, an installation or removal of a second electric component or a third electric component can be accommodated easily by merely attaching or detaching an electric power line.

A bicycle electrical system according to a thirteenth aspect is provided according to the twelfth aspect, wherein each of the second and the third electric components has identification information, and the control section receives identification information from the second electric component upon connection of the second electric component, and receives identification information from the third electric component upon connection of the third electric component. With this aspect, the control section can reliably recognize which electric components are connected by receiving identification information each time an electric component is connected.

A bicycle electrical system according to a fourteenth aspect is basically provided with a first electric component and a second electric component. The first electric component includes a first electric power line communication section, an electric motor and an electric motor control section configured to control the electric motor. The second electric component including a second electric power line communication section. The first electric power line communication section and the second electric power line communication section being connected with an electric power line such that the first and second electric power line communication sections conduct communication via the electric power line.

In this bicycle electrical system, each of the first electric component (which includes the electric motor) and the second electric component has an electric power line communication section with which communication can take place through an electric power line. Consequently, control signals can be modulated and superimposed onto electric power transmissions at each of the electric components and the control signals can be decoded from the electric power.

Since the electric power line is a two-wire line, even if an electric component including an electric motor is connected to another electric component, the number of wires is smaller than for a system in which a separate signal line is required for each control signal. Consequently, the task of installing the wiring can be accomplished more easily.

A bicycle electrical system according to a fifteenth aspect is provided according to the fourteenth aspect, wherein the electric motor control section includes an inverter device. As a result, the electric motor, e.g., a brushless DC motor or an AC motor, can be operated efficiently.

With the bicycle electrical system, since each of the first, second and third electric components has an electric power line communication section, so long as a control section is provided in any one of the electric components or a control section is connected to one of the electric components, the wiring work can be completed such that a plurality of electric components can be controlled by merely connecting separate electric power lines between the three electric components. Since the electric power lines are only connected between two electric components, the length of the wires is shorter. Since the electric power lines are two-wire lines, the number of wires is smaller than a case in which a separate signal line is required for each control signal. Furthermore, electric components having different functions can be connected using the same two-wire power line. Consequently, the task of installing the wiring can be accomplished more easily.

Additionally, with the bicycle electrical system, since a first electric component including an electric motor and a second electric component both have an electric power line communication section with which communication can be accomplished through an electric power line, the wiring work can be completed by merely connecting separate electric power lines between the three electric components. Thus, the wiring work can be completed more easily.

These and other objects, features, aspects and advantages of the bicycle electrical system will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
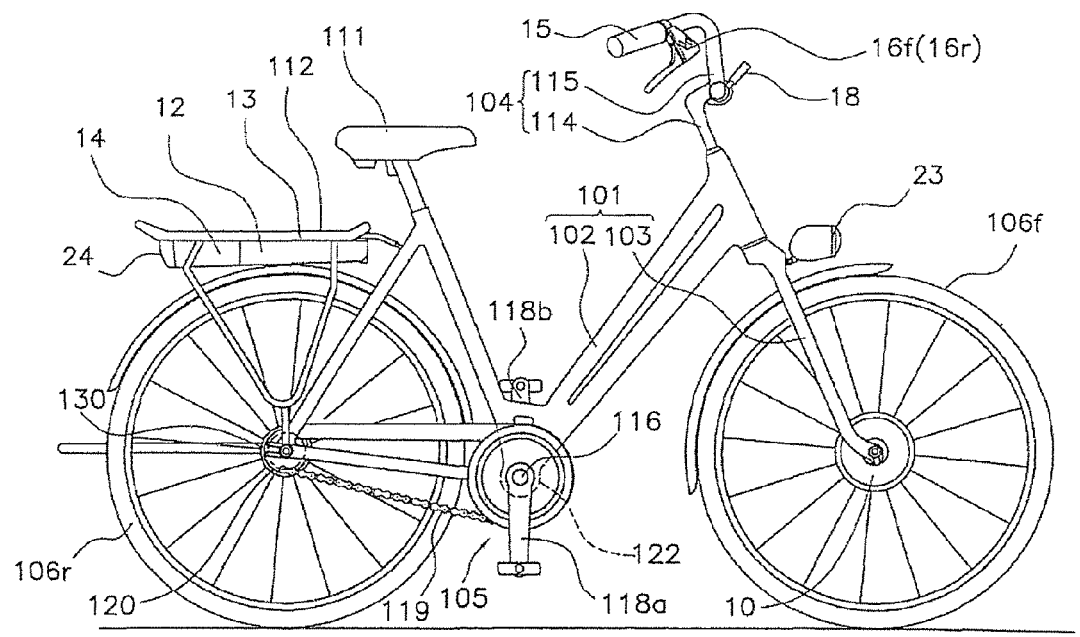
FIG. 1 is a side elevational view of a bicycle equipped with a bicycle electrical system in accordance with a first embodiment.
Figure 6:
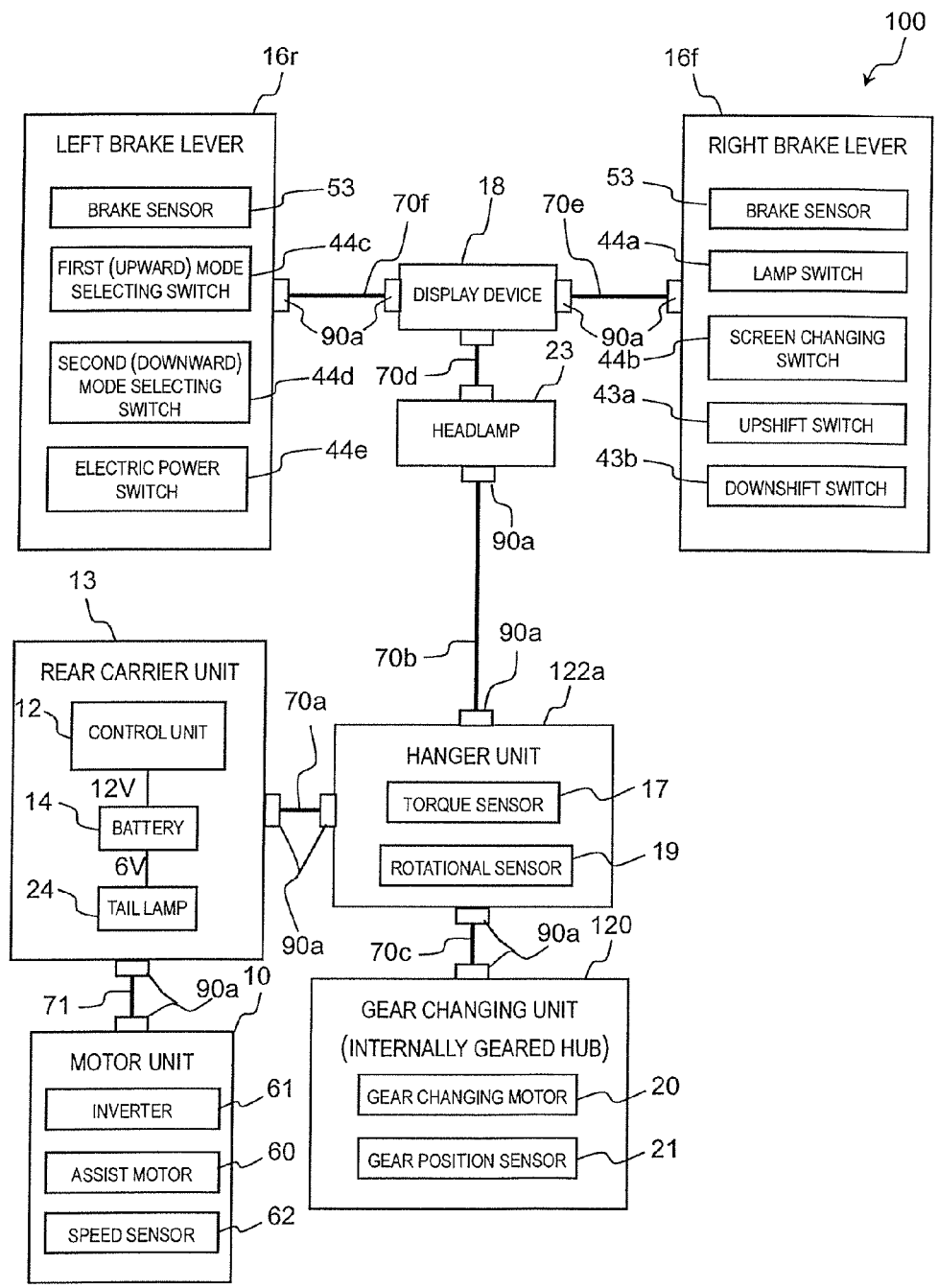
FIG. 6 is a block diagram of constituent features in the bicycle electrical system according to the first embodiment.

Referring initially to FIGS. 1 and 6, a bicycle is illustrated that is equipped with a bicycle electrical system 100 (FIG. 6) in accordance with a first embodiment. The bicycle electrical system 100 is configured and arranged such that the task of installing wiring can be accomplished more easily. The bicycle electrical system 100 includes, among other electrical components, a motor unit 10, a control section 12, a rear carrier unit 13, a battery 14, a torque sensor 17, a display device 18, a rotational sensor 19, a gear changing motor 20, a gear position sensor 21, a front headlamp 23 and a tail lamp 24.

In the illustrated embodiment, the bicycle is configured to assist a rider by using the motor unit 10 to supplement a drive force imparted by the rider. In the illustrated embodiment, the bicycle includes a frame 101 with a frame body 102 and a front fork 103, a handlebar unit 104. The bicycle also includes a drive section 105, a front wheel 106f, a rear wheel 106r, a front brake device and a rear brake device (not shown). The front fork 103 is attached to a frontward portion of the frame body 102 such that it can pivot about a slanted axis.

A saddle 111, the handlebar unit 104, and other components are attached to the frame 101. The drive section 105 includes a crank axle 116, a gear crank 118a, a left crank 118b, a chain 119 and an internally geared hub 130 driven by the chain 119. The crank axle 116 is rotatably supported in a hanger section 122 (i.e., the bottom bracket shell, shown in FIG. 1) of the frame body 102. The gear crank 118a and the left crank 118b are fixed to opposite ends of the crank axle 116. The chain 119 is arranged on the gear crank 118a. The internally geared hub 130 is driven by the chain 119. The internally geared hub 130 is arranged in a center of the rear wheel 106r. The internally geared hub 130 has, for example, eight gears (speeds). The gears are changed by the gear changing motor 20. A gear changing unit 120 is connected to the internally geared hub 130 for electric drive. As shown in FIG. 6, the gear position sensor 21 is configured to detect gear number indicating a gear position that is provided in the gear changing unit 120 by the gear changing motor 20. The internally geared hub 130 is connected to a rear brake device comprising, for example, a roller brake, a band brake, or a disk brake.

A rear carrier 112 is attached to an upper rearward portion of the frame body 102. The rear carrier 112 supports the rear carrier unit 13 that includes the control section 12. The battery 14 is removably installed in the rear carrier unit 13. The battery 14 constitutes an electrical energy storage device that serves as a power source for the control section 12, the front headlamp 23 and other components. The battery 14 includes, for example, a nickel hydrogen battery or a lithium ion battery. The tail lamp 24 is attached to the battery 14 so as to form an integral unit.

The motor unit 10 serves to apply an assistance drive force to the front wheel 106f. The motor unit 10 is attached to a center of the front wheel 106f. The motor unit 10 is connected to a front brake device comprising, for example, a roller brake, a band brake, or a disk brake. If a roller brake, a band brake, a disk brake or other type of front brake is not connected to the motor unit 10, then a V-brake, a cantilever brake or other brake device should be provided on the front fork 103. As shown in FIG. 6, an assist motor 60, an inverter 61, and a speed sensor 62 are provided inside the motor unit 10. The assist motor 60 is, for example, a three-phase brushless DC motor or an AC motor. The inverter 61 converts a direct current outputted from the battery 14 into an alternating current suitable for driving the assist motor 60. The speed sensor 62 detects a rotational speed of the assist motor 60, i.e., a speed of the bicycle.

As shown in FIG. 6, a hanger unit 122a (explained later) is provided in the hanger section 122 (shown in FIG. 1). The hanger unit 122a has the torque sensor 17 for detecting a pedaling force acting on the crank axle 116 and the rotational sensor 19 serving to detect a rotation direction of the crank axle 116.

The control section 12 is disposed inside the rear carrier unit 13. The control section 12 has a microcomputer that serves to control electric components. The electric components of the bicycle electrical system are connected to the control section 12. During an assist mode, the control section 12 can control the motor unit 10 to generate an assisting force up to a maximum of twice as large as a pedaling force exerted by a rider. The control section 12 controls the assist motor 60 with a plurality of regenerative braking modes and a plurality of assist modes. More specifically, the control unit 12 has three assist modes: a high assistance mode in which a pedaling force is supplemented with an assisting force of N1 times the pedaling force, a medium assistance mode in which a pedaling force is supplemented with an assisting force of N2 times the pedaling force, and a low assistance mode in which a pedaling force is supplemented with an assisting force of N3 times the pedaling force. The values N1, N2, and N3 are expressed with predetermined numbers selected such that N1>N2>N3. For example, the numbers might be selected such that N1 has a value of 2, N2 has a value of 1.5, and N3 has a value of 1. Meanwhile, there are two regenerative braking modes: a high regeneration mode in which regenerative braking is executed with a predetermined first regenerative braking force and a low regeneration mode in which regenerative braking is executed with a predetermined second regenerative braking force. The predetermined second braking three is selected to have, for example, one half the magnitude of the predetermined first braking force. There is also an off mode in which neither pedaling assistance nor regenerative braking is executed. In die high regeneration mode or the low regeneration mode, a braking force exerted by regenerative braking is varied according to a movement position of a right brake lever 16f (explained later) until braking starts. When braking starts, regenerative braking is executed such that the first regenerative braking force or the second regenerative braking force is exerted. In the regenerative braking mode, the assist motor 60 (explained later) is operated as an electric generator to exert a braking force against the front wheel 106f and the braking force is controlled according to a movement position of the right brake lever 16f (a movement position of a lever member 31 explained later). In the regenerative braking mode, electric power generated by the assist motor 60 while the front wheel 106f is being braked is stored in the battery 14. The handlebar unit 104 has a handlebar stem 114 fixed to an upper portion of the front fork 103. The handlebar unit 104 also has a standard flat or riser type handlebar 115 that is fixed to the handlebar stem 114. A right brake lever 16f and a left brake lever 16r as well as grips 15 are attached to both ends of the handlebar 115 as shown in the top plan view of the handlebar unit 104 shown in FIG. 2. The display device 18 is fixed to a middle portion of the handlebar 115 such that it straddles the handlebar stem 114. The display device 18 has a liquid crystal display screen 18a. The liquid crystal display screen 18a can be switched between an assist screen shown in FIG. 3 and a cycling computer screen shown in FIG. 4. From the assist screen shown in FIG. 3, a user can select from either an assist mode or a regenerative braking mode. From the cycling computer screen shown in FIG. 4, a user can select to view either a speed, a gear position and/or a traveled distance of the bicycle. The assist screen shown in FIG. 3 enables a user to select among, for example, two regenerative braking modes, three assist modes, and an off mode in which neither assistance nor regenerative braking is executed. A first mode selecting switch 44c or a second mode selecting switch 44d is used to move a cursor up or down. When the cursor is left in a particular mode position without being moved for longer than several seconds, then that mode is selected. The cursor remains stopped at the selected mode. The left and right directions of the bicycle are defined to be the left and right directions as viewed from a position rearward of the bicycle.

The right brake lever 16f is connected to a front brake device with a front brake cable. The left brake lever 16r is connected to a rear brake device with a rear brake cable. Each of the right brake lever 16f and the left brake lever 16r is provided with a mounting bracket 30 configured to be detachably mounted to the handlebar 115 and a lever member 31 attached to the mounting bracket 30 such that it can pivot freely.

Figure 2:
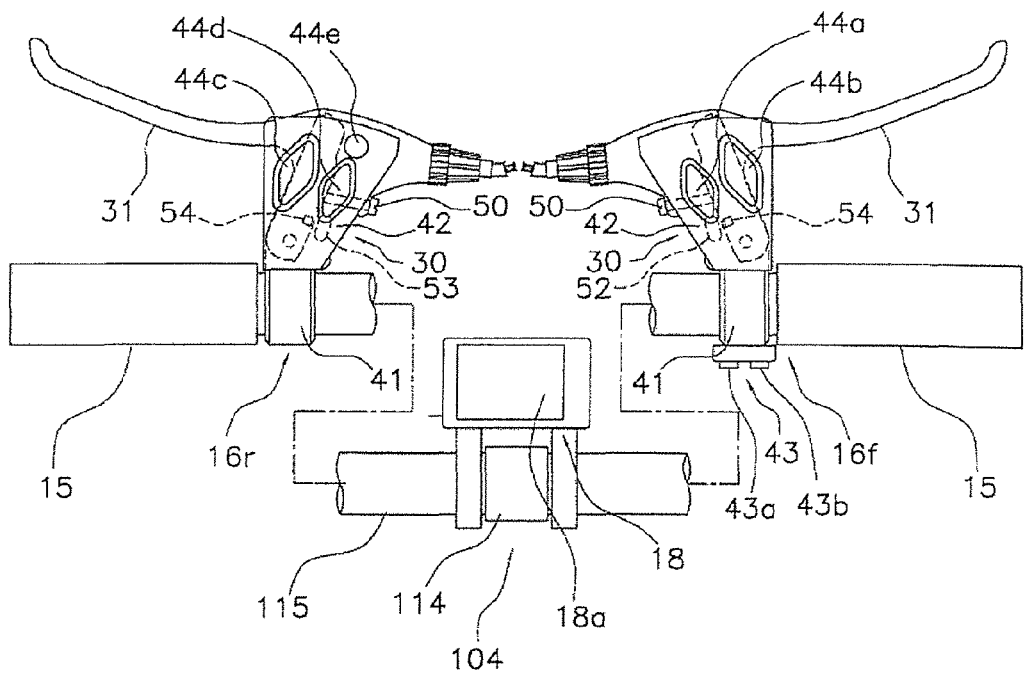
FIG. 2 is a top plan view of a pair of brake levers with operating buttons and a display device exemplifying electric components.

As shown in FIG. 2, each of the mounting brackets 30 has a mounting section 41 and a bracket section 42. The mounting section 41 is configured to be attached to the handlebar 115 and located downward in FIG. 2. The bracket section 42 is connected to the mounting section 41. The mounting section 41 is configured such that the mounting bracket 30 can be fastened to the handlebar 115 by tightening a fastening bolt (not shown). A gear shifter 43 is detachably mounted to the bracket section 42 of the right brake lever 16f for operating the gear changing unit 120. The gear shifter 43 has, for example, an upshift switch 43a and a downshift switch 43b arranged side by side to the left and right of each other. The upshift switch 43a is a switch for shifting to a higher gear and the downshift switch 43b is a switch for shifting to a lower gear.

A light switch 44a and a screen changing switch 44b are provided on the bracket section 42 of the right brake lever 16f and arranged side by side to the right and left of each other. The screen changing switch 44b serves to switch the liquid crystal display screen 18a of the display device 18 between the assist screen and the cycling computer screen. Each time the light switch 44a is pressed, the headlamp 23 turns on or off. Each time the screen changing switch 44b is pressed, the liquid crystal display screen 18a of the display device 18 changes to the assist screen or the cycling computer screen.

A first mode selecting switch 44c, a second mode selecting switch 44d, and a power switch 44e are arranged on the bracket section 42 of the left brake lever 16r. The first (upward) mode selecting switch 44c is used to select the regenerative braking modes and the assist modes sequentially in an upward direction from the perspective of the screen shot shown in FIG. 3. The second (downward) mode selecting switch 44d is used to select the regenerative braking modes and the assist modes sequentially in an downward direction from the perspective of the screen shot shown in FIG. 3. The power switch 44e is a circular push button switch that is arranged above the second mode selecting switch 44d in FIG. 2 and serves as a power on-off switch for the control section 12. Each time the first mode selecting switch 44c is pressed, a cursor for selecting the regenerative braking mode or assist mode moves sequentially upward on the screen. The mode where movement of the cursor stops is selected. Similarly, the second mode selecting switch 44d serves to move the cursor sequentially downward one mode at a time. Although in this example the modes are arranged on the screen in a vertical fashion, it is also acceptable for the modes to be arranged horizontally from left to right. The power switch 44e turns the electric power of the control section 12 on or off each time it is pressed.

An initial position adjusting section 50 is provided on each of the bracket sections 42 and serves to enable an initial position of the lever member 31 to be adjusted with an adjusting bolt. A brake sensor 53 is provided inside the bracket section 42 for detecting a movement position of the lever member 31 from the initial position. The brake sensor 53 uses a linear Hall-effect element to measure a distance from the lever member 31. More specifically, the brake sensor 53 detects a position to which the lever member 31 has moved from the initial position based on a distance from a magnet 54 embedded in the lever member 31. The control section 12 controls regenerative braking in accordance with the movement position of the lever member 31.

Figure 5:
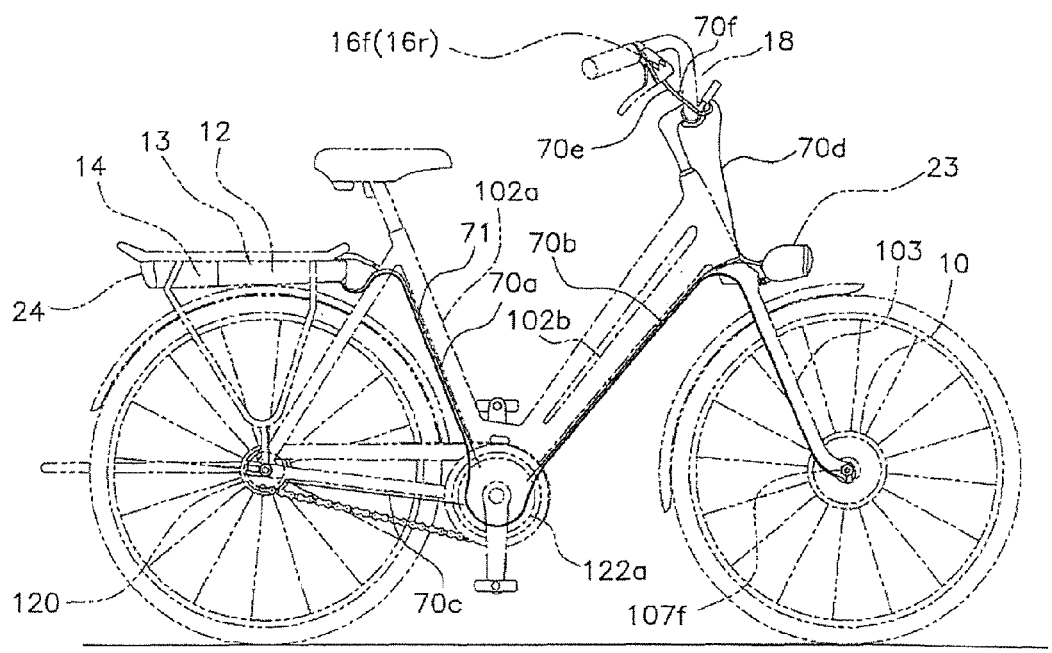
FIG. 5 is a side elevational view of the bicycle of FIG. 1 showing an arrangement of electric components in the bicycle electrical system according to the first embodiment.

As shown in FIGS. 5 and 6, the bicycle electrical system 100 of the first embodiment includes the following electric components: the rear carrier unit 13, the motor unit 10, the hanger unit 122a, the gear changing unit 120 installed onto the internally geared hub 130 of the rear wheel 106r, the headlamp 23, the display device 18, the right brake lever 16f and the left brake lever 16r. These electric components are connected with electric power lines 70a to 70f through which communication can be executed and an electric power line 71. In FIG. 5, the electric power lines 70a to 70f are indicated with solid lines and the electric power line 71 is indicated with a bolder line than the electric power lines 70a to 70f. Each of the electric power lines 70a to 70f and 71 has a two-conductor structure. One of the two conductors is a ground wire. In this embodiment, the linear carrier unit 13 corresponds to a first electric component arranged at a first (initial) end of the bicycle electrical system 100. In this embodiment, the hanger unit 122a, the headlamp 23 and the display device 18 correspond to second electric components arranged in intermediate positions of the bicycle electrical system 100. In this embodiment, the motor unit 10, the gear changing unit 120, the right brake lever 16f, and the left brake lever 16r correspond to third electric components arranged at a second (terminal) end of the bicycle electrical system 100. The electric power line 70a and the electric power line 71 correspond to a first electric power line, and the electric power lines 70c, 70e, and 70f correspond to second electric power lines.

The rear carrier unit 13 includes the control section 12 (which controls the electric components of the bicycle electrical system 100), the battery 14, and the tail lamp 24. The rear carrier unit 13 is attached to the rear carrier 112. The control section 12 has a microcomputer. The battery 14 is detachably mounted to the control section 12 and serves as a power source for the bicycle electrical system 100. The tail lamp 24 is attached to the battery 14 so as to form a main integral unit.

The motor unit 10 is connected to the rear carrier unit 13 through the electric power line 71. The electric power line 71 is configured to carry a 24-volt power source current. As shown in FIG. 5, the electric power line 71 extends from the rear carrier unit 13 and runs along the seat tube 102a and the hanger section 122 (shown in FIG. 1) before extending forward along the down tube 102b. The electric power line 71 then runs along the front fork 103 to a tip end of the front fork 103, where the electric power line 71 connects to an electric power line connecting section 90a (explained later, see FIG. 8) fastened to a front wheel hub shaft 107f. The other electric power lines 70a to 70f are configured to carry 6-volt power source currents. Thus, in the first embodiment, two types of electric power line are used to connect the electric components.

Figure 9:
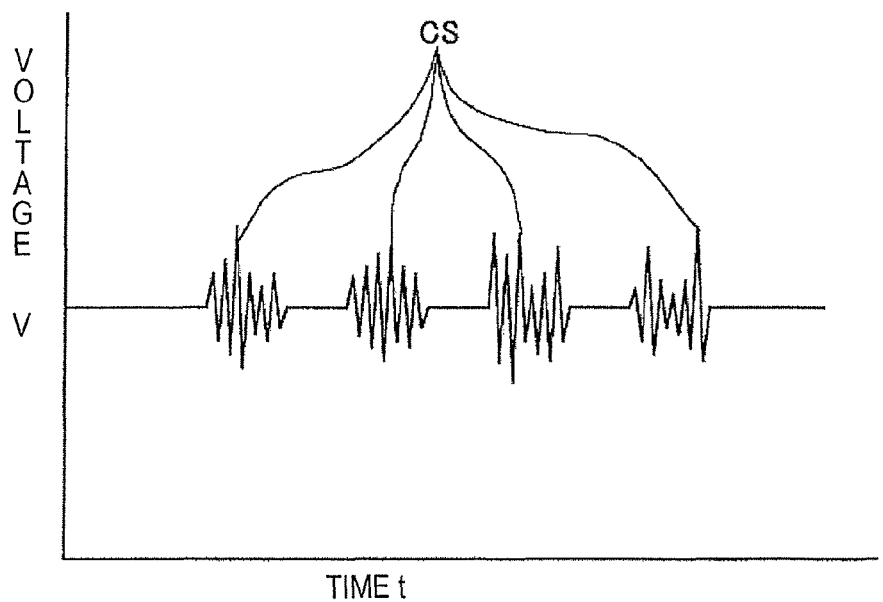
FIG. 9 shows an example of a waveform of a control signal transmitted through an electric power line.

As shown in FIG. 9, control signals CS that control the electric components are superimposed on the power source currents flowing in the electric power lines. Each of the control signals CS comprises serial data including control information and identification information identifying an electric component.

The hanger unit 122a is connected to the rear carrier unit 13 through the electric power line 70a. As shown in FIG. 5, the electric power line 70a extends from the rear carrier unit 13 and runs along the seat tube 102a to the hanger unit 122a. The hanger unit 122a is attached to the hanger section 122 (shown in FIG. 1). The hanger unit 122a has the torque sensor 17 and the rotational sensor 19 as explained previously. The torque sensor 17 serves to detect a pedaling force to be used for assistance control. The rotational sensor 19 is provided to ensure that an assistance operation is executed when the crank axle 116 is rotating in a positive direction (in a direction corresponding to forward movement of the bicycle). The headlamp 23 is connected to the hanger unit 122a through the electric power line 70b and the gear changing unit 120 is connected separately to the hanger unit 122a through the electric power line 70c.

The headlamp 23 is, for example, an energy efficient lamp that uses an LED (light emitting diode). The headlamp 23 is mounted to a front surface of the front fork 103. The gear changing unit 120 has the gear changing motor 20 and the gear position sensor 21. An output of the gear position sensor 21 is used by the display device 18 to indicate a gear position of the internally geared hub 130. The display device 18 is connected to the headlamp 23 through the electric power line 70d.

Figure 3:
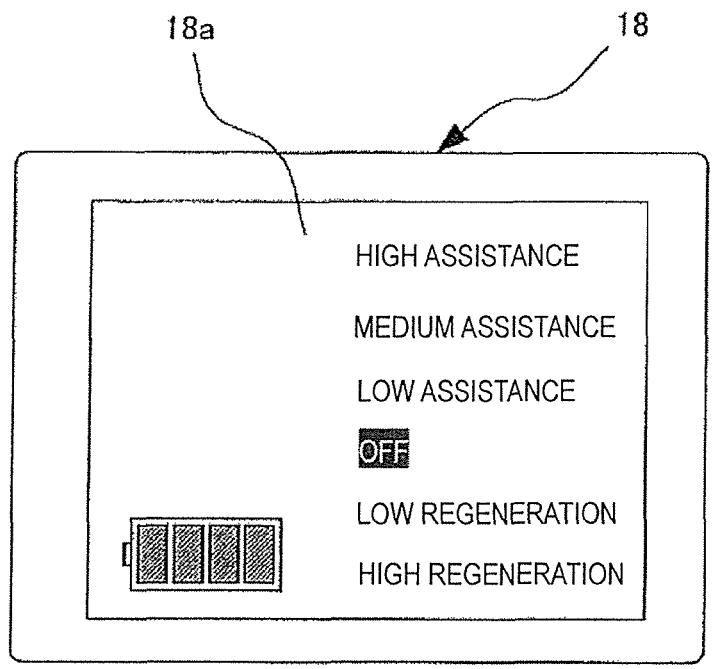
FIG. 3 is a screen shot showing an example of content displayed on a mode screen of the display device.
Figure 4:
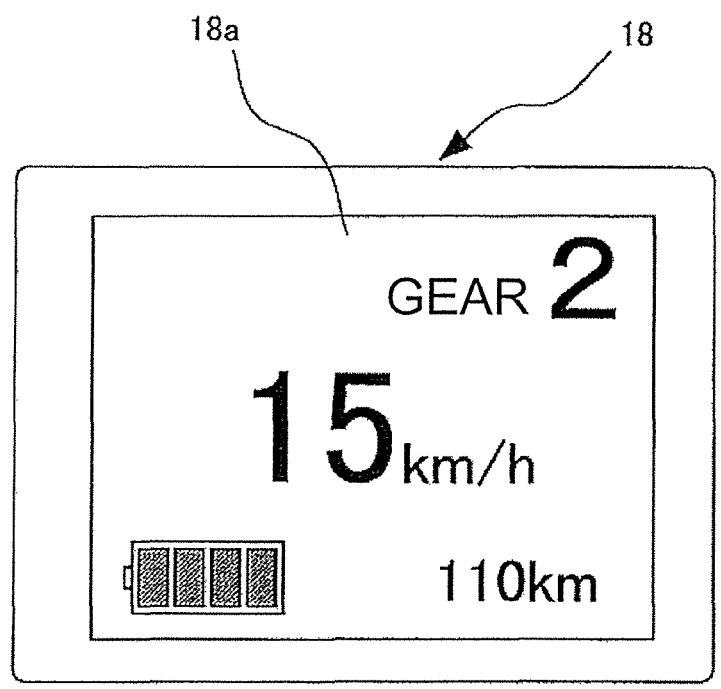
FIG. 4 is a screen shot showing an example of content displayed on a cycling computer screen of the display device.

As explained previously, the display device 18 has a liquid crystal display screen 18a that can be switched between the assist mode screen shown in FIG. 3 and the cycling computer screen shown in FIG. 4. The remaining capacity of the battery 14 is indicated on both the screens. The display device 18 is connected separately to the right brake lever 16f by the electric power line 70e and to the left brake lever 16r by the electric power line 70f.

The right brake lever 16f and the left brake lever 16r have already been explained in detail and explanations there are omitted here.

Figure 8:
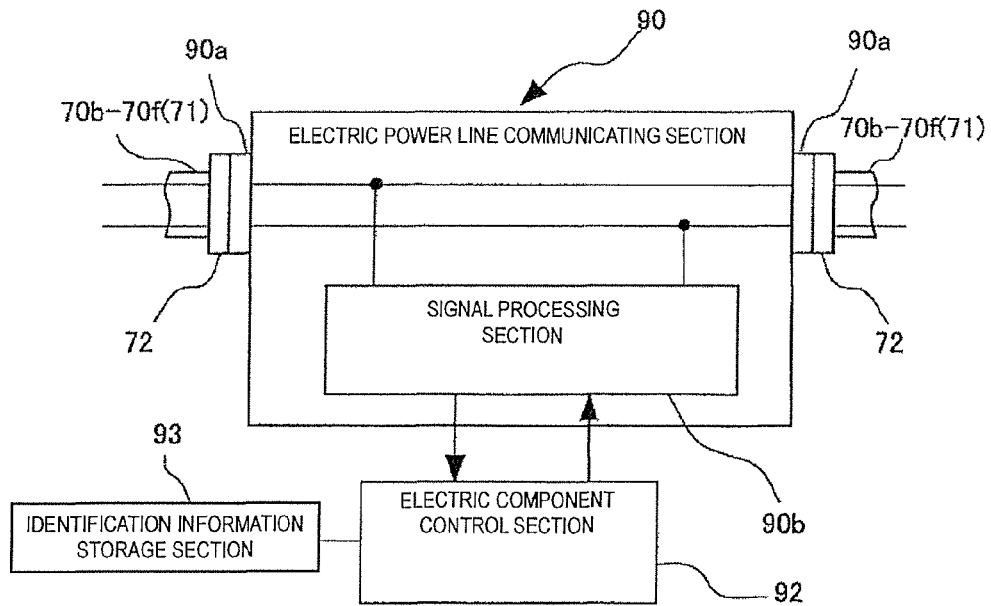
FIG. 8 is a block diagram showing a constituent components of an electric power line communication section.

As shown in FIG. 8, each of the electric components, including the electric component in which the control section 12 is installed, is provided with an electric power line communication section 90 and an electric component control section 92 serving to control the electric component. An electric power line communication section 90 is configured to execute communication by PLC (power line communications), i.e., to execute two-way communications through the electric power lines. Each of the electric power line communication sections 90 has one or a plurality of electric power line connecting sections 90a. In FIG. 6 and the block diagrams of FIGS. 10 to 14 (explained later), the electric power line connecting sections 90a where the electric power lines connect to the electric components are depicted with small rectangles (in the block diagrams of FIGS. 10 to 14, the small rectangles are depicted without reference numerals for the sake of simplicity). For example, the rear carrier unit 13 has a 24-volt electric power line connecting section 90a and a 6-volt electric power line connecting section 90a, while the hanger unit 122a and the display device 18 each have three 6-volt electric power line connecting sections 90a. The headlamp 23 has two 6-volt electric power line connecting sections 90a. The motor unit 10, the gear changing unit 120, the right brake lever 16f and the left brake lever 16r arranged at a terminal end of the bicycle electrical system 100 each have one electric power line connecting section 90a. Plugs 72 (terminal connectors) are provided on both ends of each of the electric power lines 70a to 70f and 71. Each of the electric power line connecting sections 90a is configured to electrical connected to one of the plugs 72 such that the electric power line connecting section 90a is secured in a detachable fashion. Each of the electric power line connecting sections 90a is connected to the electric power line communication section 90 and the electric component control section 92 as seen in FIG. 8.

Each of the electric power line communication sections 90 also has a signal processing section 90b configured to decode and modulate control signals superimposed on electric power. The signal processing section 90b is configured to decode and modulate control signals using, for example, an OFDM method (orthogonal frequency division multiplexing method).

Figure 7:
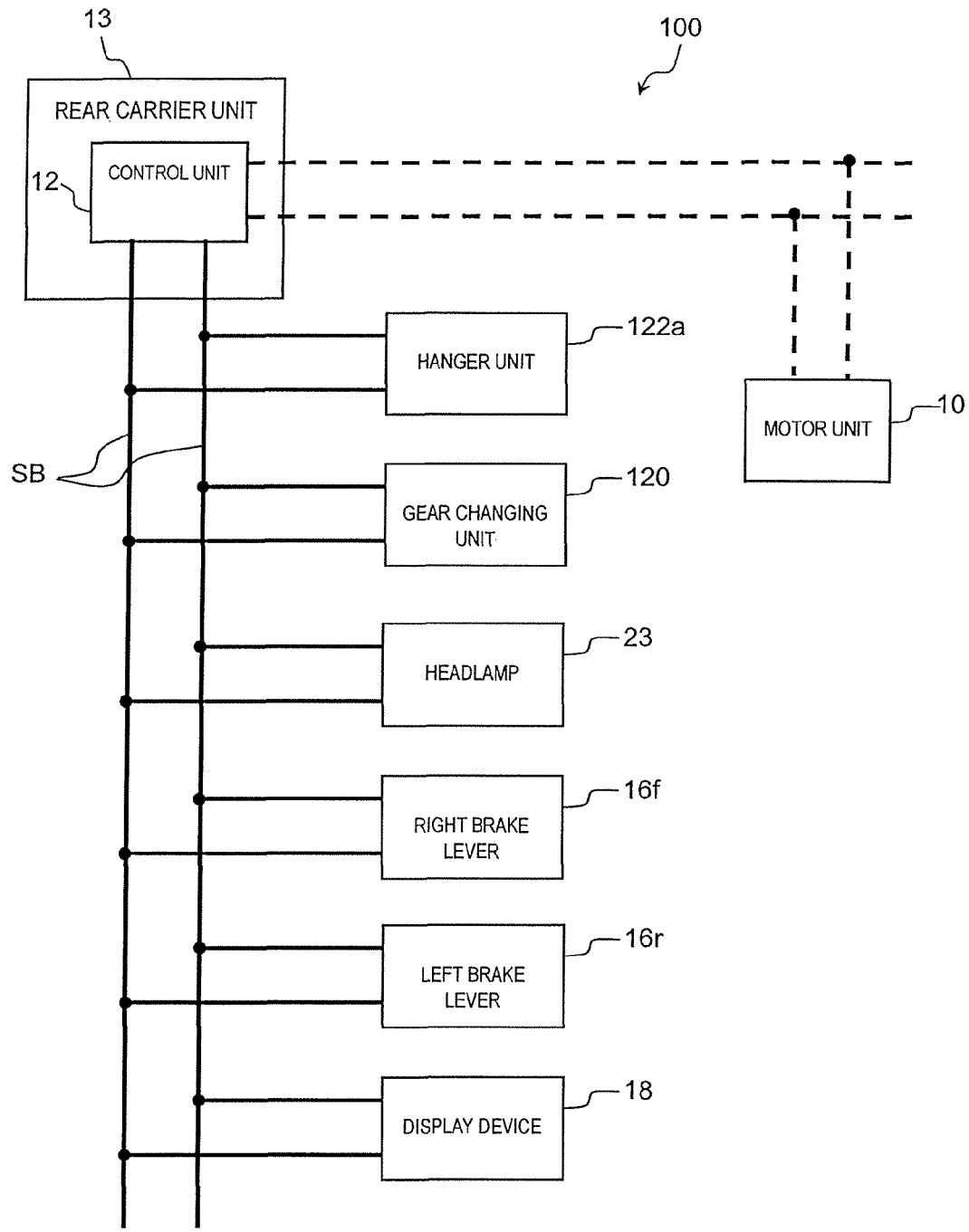
FIG. 7 is a block diagram showing an electrical connection scheme of the bicycle electrical system.

Each of the electric component control sections 92 has a microcomputer and serves to control an individual electric component (e.g., the gear changing unit 120 or the display device 18). An identification information storage section storing unique identification information for the electric component is connected to the electric component control section 92. When an electric component is connected, the control section 12 receives identification information from the electric component and recognizes the connected electric component. As a result, the control section 12 can transmit a control signal directed to the connected electric component and receive a control signal from the connected electric component. The control section 12 functions as the electric component control section 92 of the rear carrier unit 13. As shown in FIG. 7, the electric components are connected to a serial bus structure. More specifically, as shown in FIG. 8, a serial bus SB is provided inside each of the electric power line communication sections 90 and the overall serial bus SB is formed by the electric power line communication sections 90 and the electric power lines 70a to 70f and 71. As a result, excluding the electric component (e.g., the rear carrier unit 13) in which the control section 12 is installed, the bicycle electrical system 100 can operate regardless of whether any of the electrical components is connected or disconnected. For example, even if the headlamp 23 is removed from the configuration shown in FIG. 6, the bicycle electrical system 100 will operate so long as the electric power line 70b is connected to the display device 18. Also, if the internally geared hub 130 will be operated using a regular gearshift cable, then the electric power line 70c should be removed. In this case, too, the bicycle electrical system 100 will operate.

Figure 10:
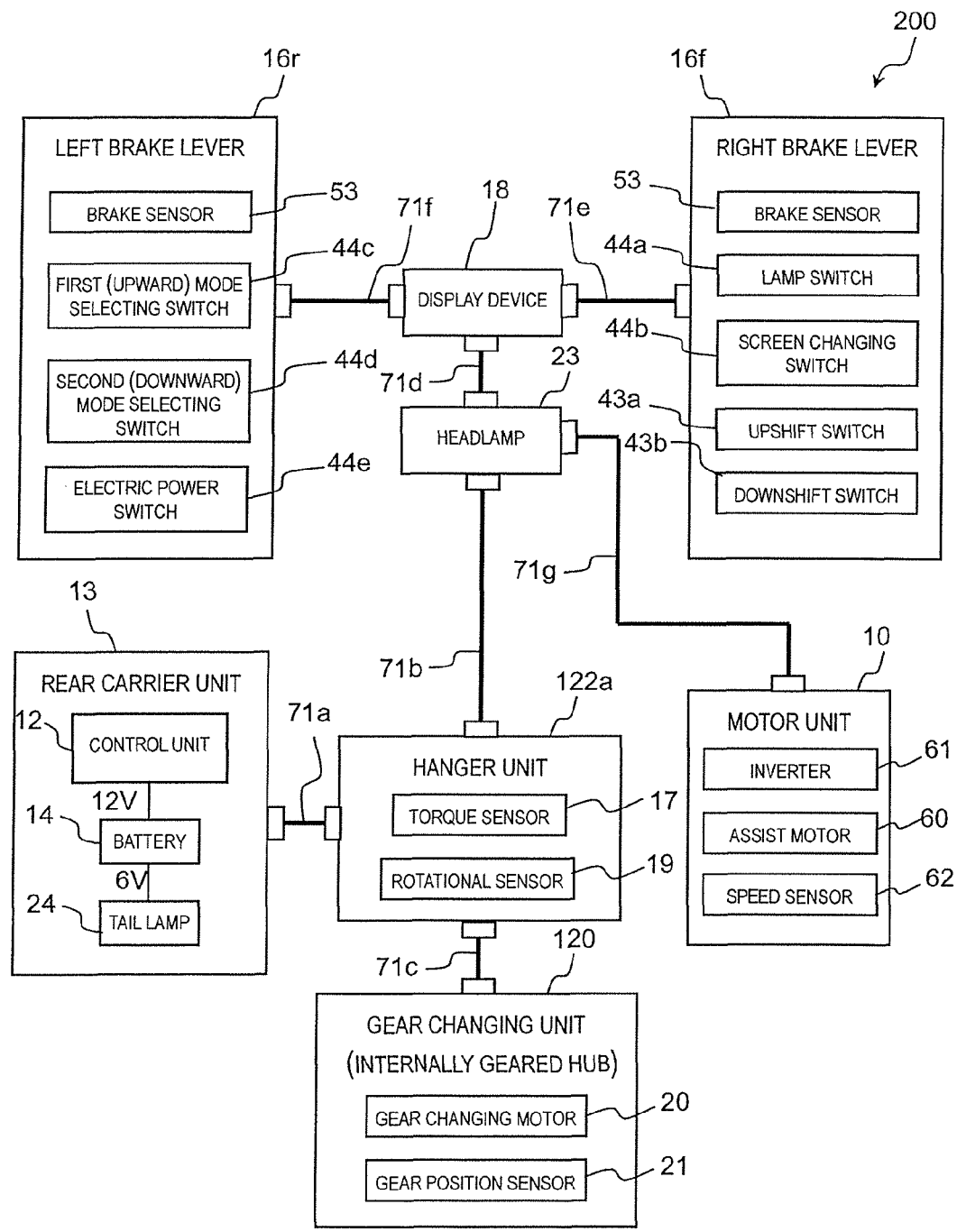
FIG. 10 is a block diagram of a bicycle electrical system in accordance with a second embodiment that basically corresponds to FIG. 6.

FIG. 10 shows a bicycle electrical system 200 according to a second embodiment in which all of the electric components are connected with 24-volt electric power lines 71a to 71g. Thus, in the second embodiment, the motor unit 10 is connected to the headlamp 23 through an electric power line 71e instead of connected to the rear carrier unit 13. Otherwise, the connection configuration is the same as in the first embodiment. Thus, in the same manner as FIG. 6, the electric power line communication section 90 (FIG. 8) is connected to each of the electrical components of this embodiment, via the electric power line connecting sections 90a, which are depicted with small rectangles without reference numerals in FIG. 10.

The headlamp 23 is closer to the motor unit 10 than the rear carrier unit 13. Consequently, the electric power line 71g connecting the headlamp 23 to the motor unit 10 is shorter than the electric power line 71. Also, since the headlamp 23 is attached to the front fork 103, the headlamp 23 does not move with respect to the electric power line connecting section 90a of the motor unit 10. As a result, the wiring layout is even simpler.

Figure 11:
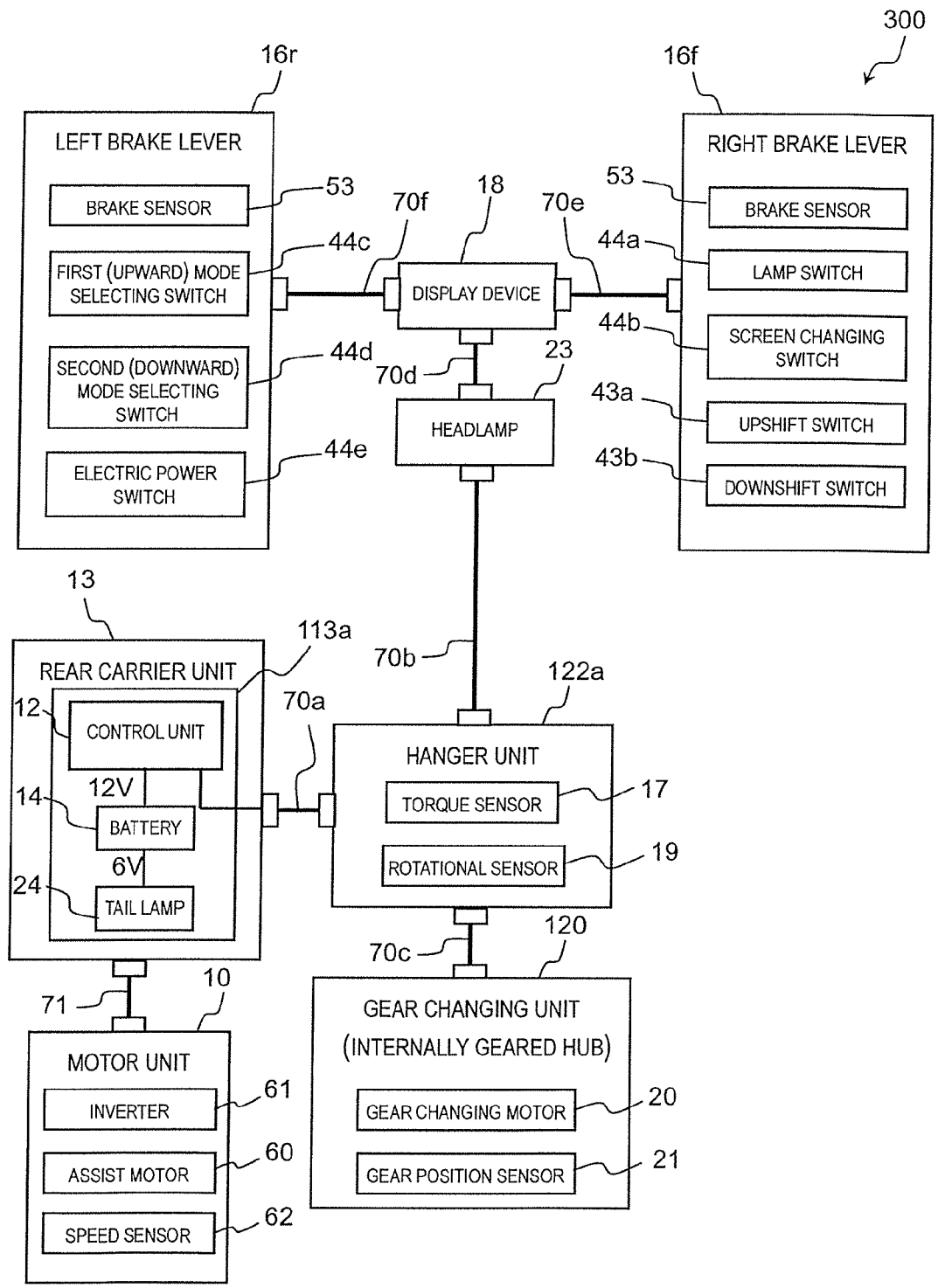
FIG. 11 is a block diagram of a bicycle electrical system in accordance with a third embodiment that basically corresponds to FIG. 6.

FIG. 11 shows a bicycle electrical system 300 according to a third embodiment in which the control section 12, the battery 14, and the tail lamp 24 are housed in one battery unit 113a arranged in the rear carrier unit 13. In this way, a water resistant performance of the rear carrier unit 13 can be improved. Otherwise, the constituent features are the same as in the first embodiment. Thus, in the same manner as FIG. 6, the electric power line communication section 90 (FIG. 8) is connected to each of the electrical components of this embodiment, via the electric power line connecting sections 90a, which are depicted with small rectangles without reference numerals in FIG. 11.

Figure 12:
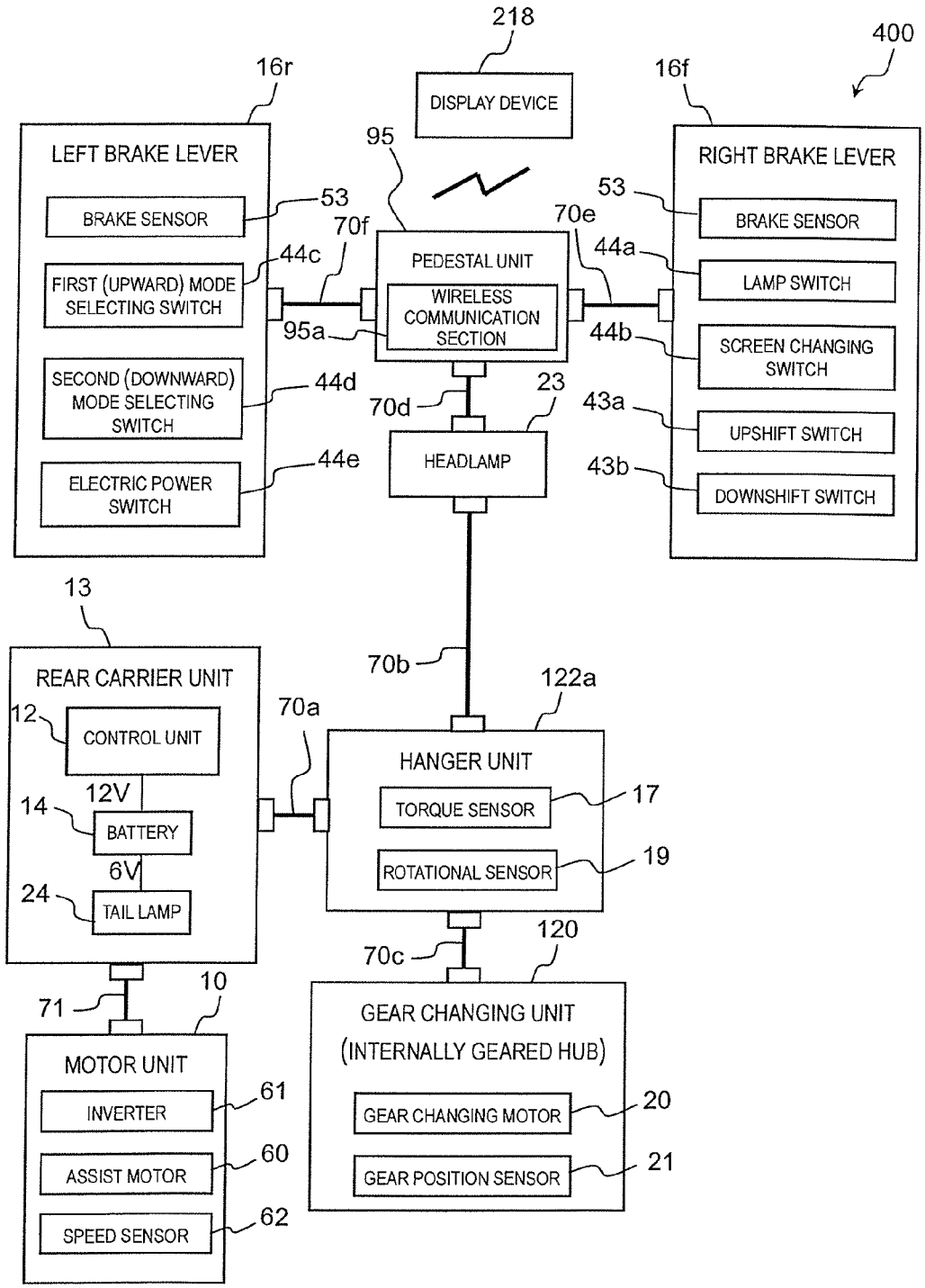
FIG. 12 is a block diagram of a bicycle electrical system in accordance with a fourth embodiment that basically corresponds to FIG. 6.

FIG. 12 shows a bicycle electrical system 400 according to a fourth embodiment in which a display device 218 is connected wirelessly to a pedestal unit 95 attached to a middle portion of the handlebar 115. The display device 218 is detachably mounted to the pedestal unit 95. The pedestal unit 95 includes a wireless communication section 95a for executing wireless communications with respect to the display device 218. The wireless communication section 95a executes wireless communications with respect to the display device 218 at a prescribed low power in accordance with a wireless communication standard, such as IEEE 802.15.1 or IEEE 802.15.4. Otherwise, the constituent features are the same as in the first embodiment. Thus, in the same manner as FIG. 6, the electric power line communication section 90 (FIG. 8) is connected to each of the electrical components of this embodiment, via the electric power line connecting sections 90a, which are depicted with small rectangles without reference numerals in FIG. 12.

In this embodiment, the display device 218 is removable and can be carried about. More particularly, if the display device 218 has a navigation function or a function that enables it to receive broadcast waves for television and radio broadcasts, then the ability to detach it and use it away from the bicycle will be an added convenience.

Figure 13:
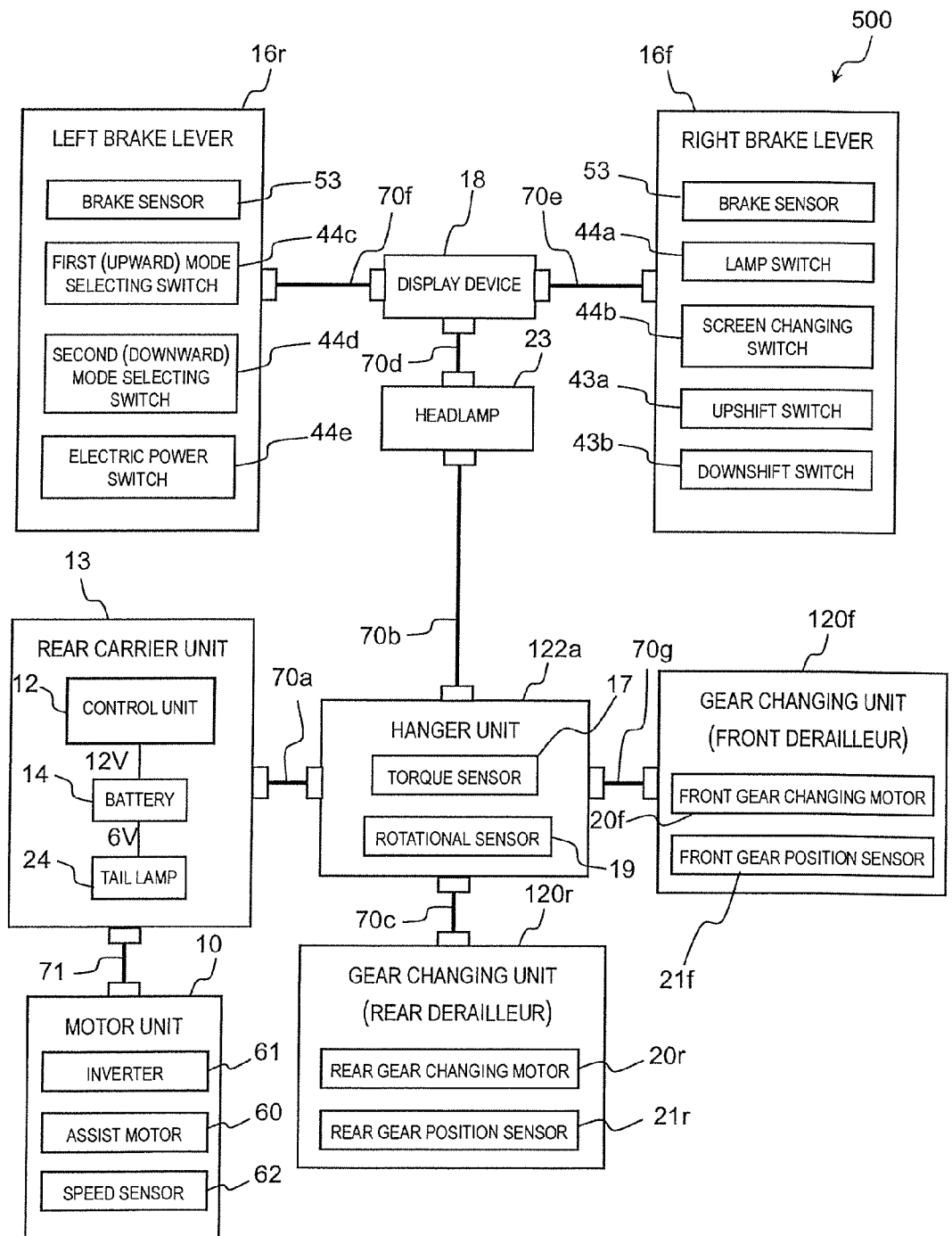
FIG. 13 is a block diagram of a bicycle electrical system in accordance with a fifth embodiment corresponding to FIG. 6.
Figure 14:
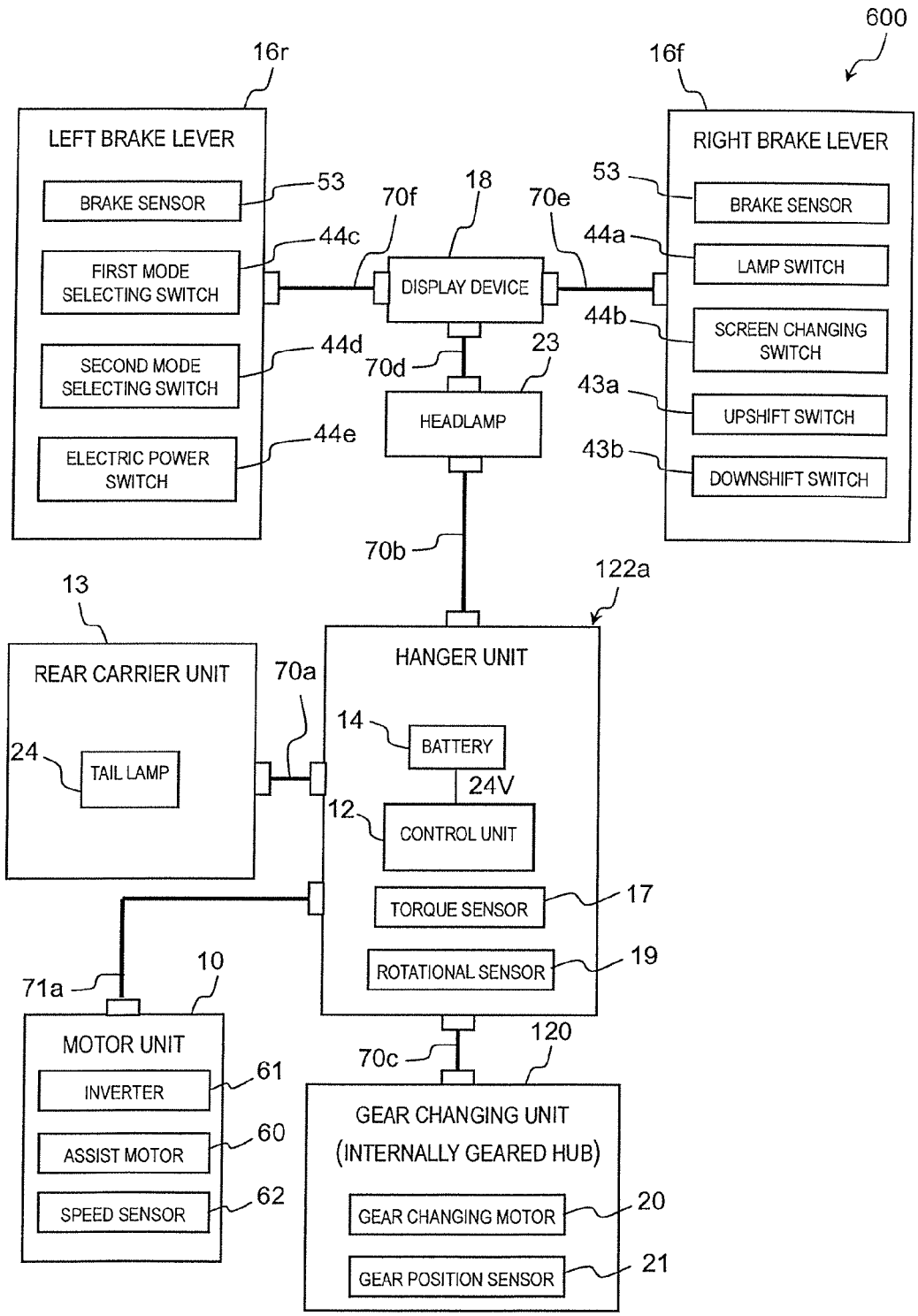
FIG. 14 is a block diagram of a bicycle electrical system in accordance with a sixth embodiment that basically corresponds to FIG. 6.

FIG. 13 shows a bicycle electrical system 500 according to a fifth embodiment. Although the first to fourth embodiments are related to a bicycle having an internally geared hub 130, the fifth embodiment applies the bicycle electrical system to a sports oriented bicycle having a front derailleur 120f and a rear derailleur 120r.

As shown in FIG. 13, four electric power line connecting sections (depicted with small rectangles without reference numerals) are provided on the hanger unit 122a. The rear derailleur 120r is connected to the hanger unit 122a through the electric power line 70c. The front derailleur 120f is connected to the hanger unit 122a through the electric power line 70g. Otherwise, the constituent features are the same as in the first embodiment. In this way, the bicycle electrical system can also be applied to a bicycle having an external gear changing device that is electrically driven.

In a bicycle electrical system 600 according to a sixth embodiment, the control section 12 is provided in the hanger unit 122a, which corresponds to a second electric component, instead of in the rear carrier unit 13. Only the tail lamp 24 is provided on the rear carrier 112. The electric power line communication section 90 (FIG. 8) is provided on the tail lamp 24 via the electric power line connecting section 90a, which is depicted with small rectangles without a reference numeral in FIG. 14. Thus, the tail lamp 24 is also connected to the hanger unit 122a with the electric power line 70a. If the bicycle does not have a rear carrier, then the tail lamp 24 can be provided on a fender or a seat stay. It is acceptable for the battery 14 to be detachably mounted to the control section 12 or detachably fixed to the seat stay.

In such a case, the length of the electric power line 71 is shorter because the distance from the rear carrier 112 to the front wheel 106f is shorter. Also, it is more difficult for the electric power lines to become complex. Consequently, the work of installing the electric power lines is even easier. Otherwise, the constituent features are the same as in the first embodiment.

While only selected embodiments have been chosen to illustrate the bicycle electrical system, it will be apparent to those skilled in the art from this disclosure that various changes and modifications can be made herein without departing from the scope of the invention as defined in the appended claims.

For example, although in the previously explained embodiments, a control section is provided in a first electric component or a second electric component, it is also acceptable to provide the control section in a third electric component.

Also in the previously explained embodiments, the rear carrier unit 13 is presented as an example of a first electric component, the hanger unit 122a, the headlamp 23, and the display device 18 are presented as examples of second electric components, and the gear changing unit 120, the motor unit 10, the right brake lever 16f, and the left brake lever 16r are presented as examples of a third electric component. However, the electric components are not limited to these examples. Any electric component installed on a bicycle can be a first, second, or third component. Other examples of electric components include electric powered front and rear suspension units and electric powered saddles.

Although in the previously explained embodiments the bicycle electrical system is applied to an assisted bicycle having a motor unit 10 installed on a front wheel 106f, the present invention can also be applied to an assisted bicycle having a motor unit arranged on a portion where a crank axle is arranged or an assisted bicycle having a motor unit arranged on a rear wheel 106r. In the case of an assisted bicycle having a motor arranged on a portion where the crank axle is arranged, it is good to, for example, remove a freewheel function of the rear wheel hub such that the motor unit rotates in response to rotation of the rear wheel in a forward advancement direction. In such a case, it is also acceptable to provide a one-way clutch between the crank axle and the crank.

Although in the previously explained embodiments the voltages supplied through the electric power lines are 24 volts or 6 volts, the voltages are not limited to these and voltages from, for example, 8 volts to 6 volts are also acceptable.

Although in the previously explained embodiments the electric power lines 70a to 70f and 71 each have one pair of conductors, it is acceptable for the electric power lines to include a plurality of pairs of conductors. In this way, signals can be transmitted in parallel and the signal transmission speed can be increased.

In the previously explained embodiments, it is acceptable to prepare a cable configured at one end to connect to an interface of a maintenance-purpose computer and configured at the other end to connect to an electric power line connecting section of an electric component. By using the cable to connect one of the electric power line connecting sections of each of the electric components to a computer, such tasks as upgrading the software of a microcomputer in the electric component control section of each of the electric components to a newer version and reading out a condition and/or identification information of the electric component control section can be accomplished. Since such tasks as upgrading the software to a newer version and reading out a condition and/or identification information of the electric component control section can be accomplished regardless of which electric power line connecting section is connected to the maintenance-purpose computer, a user can easily connect the maintenance-purpose computer to the electric component control sections and such tasks can be accomplished readily.

Also the structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electrical system comprising:
    a first electric component configured to be mounted on a bicycle, the first electric component including a first electric power line communication section, a first electric power line connecting section connected to the first electric power line communication section, a first electric component control section connected to the first electric power line communication section, and a first identification information storage section connected to the first electric component control section;
    a second electric component configured to be mounted on the bicycle, the second electric component including a second electric power line communication section, a pair of second electric power line connecting sections connected to the second electric power line communication section, a second electric component control section connected to the second electric power line communication section, and a second identification information storage section connected to the second electric component control section;
    a third electric component configured to be mounted on the bicycle, the third electric component including a third electric power line communication section, a third electric power line connecting section connected to the third electric power line communication section, a third electric component control section connected to the third electric power line communication section, and a third identification information storage section connected to the third electric component control section;
    a pair of two-wire electric power lines configured to be interchangeable, each of the two-wire electric power lines comprising a pair of wires and a pair of plugs connected to opposite ends of the pair of wires, each of the plugs being configured to detachably connect to any one of the first, second, and third, electric power line connecting sections; and
    a maintenance computer communication cable having a plug at one end and a computer interface connector at the other end, the plug being configured to connect to any one of the first, second, and third electric power line connecting sections and the computer interface connector being configured to connect to an interface of a maintenance-purpose computer,
    each of the two-wire electric power lines being configured to transmit both control signals and electric power between the first electric component and the second electric component, between the second electric component and the third electric component, and between the first electric component and the third electric component while one of the two-wire electric power lines is connected between the first electric power line connecting section and one of the second electric power line connecting sections and the other of the two-wire electric power lines is connected between the other of the second electric power line connecting sections and the third electric power line connecting section, the maintenance computer communication cable being configured to communicate signals between the maintenance-purpose computer and the first, second, or third electric component control section and first, second, or third identification information storing section of one of the first, second and third electric components while the maintenance computer communication cable is connected between the maintenance-purpose computer and the one of the first, second, and third electric components.

2. The bicycle electrical system according to claim 1, wherein
the first electric component has a control unit and an electric power source.

3. The bicycle electrical system according to claim 2, wherein
the control unit receives identification information from the second identification information storage section of the second electric component upon connection of the second electric component, and receives identification information from the third identification information storage section of the third electric component upon connection of the third electric component.

4. The bicycle electrical system according to claim 2, wherein
at least one of the second and the third electric component further includes an electric motor and an inverter.

5. The bicycle electrical system according to claim 2, wherein
the two-wire electric power lines are configured to transmit control signals and electric power from the first electric component to the second electric component and the third electric component while one of the two-wire electric power lines is connected between the first electric power line connecting section and one of the second electric power line connecting sections and the other of the two-wire electric power lines is connected to between the other of the second electric power line connecting sections and the third electric power line connecting section.

6. The bicycle electrical system according to claim 1, wherein
the second electric power line communication section of the second electric component has an additional electric power line connecting section.

7. The bicycle electrical system according to claim 1, further comprising
a plurality of additional second electric components that corresponds to the second electric component; and
a plurality of additional two-wire electric power lines equal in number to the additional second electric components, each of the additional two-wire electric power lines being interchangeable with the either one of the pair of two-wire electric power lines,
the pair of two-wire electric power lines and the additional two-wire electric power lines being configured to transmit control signals and electric power between the first electric component, the second electric components, and third electric component while the first electric component, the second electric components, and third electric component are connected together by the two-wire electric power lines via the first, second, and third electric power line connecting sections, the maintenance computer communication cable being configured to communicate signals between the maintenance-purpose computer and the second electric component control section and the second identification information storing section of any one of the additional second electric components while the maintenance computer communication cable is connected between the interface of the maintenance-purpose computer and the second electric power line connecting section of the one of the additional second electric components.

8. The bicycle electrical system according to claim 7, wherein
the additional second electric components are configured to perform different functions.

9. The bicycle electrical system according to claim 7, wherein
the first electric component has a control unit and an electric power source;
the two-wire electric power lines are configured to transmit control signals and electric power from the first electric component to the second electric components and the third electric component while the first, second, and third electric components are connected together with the two-wire electric power lines via the first, second, and third electric power line connecting sections.

10. The bicycle electrical system according to claim 1, wherein
a plurality of additional third electric components that corresponds to the third electric component,
a plurality of additional two-wire electric power lines equal in number to the additional third electric components, each of the additional two-wire electric power lines being interchangeable with the either one of the pair of two-wire electric power lines,
the pair of two-wire electric power lines and the additional two-wire electric power lines being configured to transmit control signals and electric power between the first electric component, the second electric component, and third electric components while the first electric component the second electric component, and third electric components are connected together by the two-wire electric power lines via the first, second, and third electric power line connecting sections,
the maintenance computer communication cable being configured to communicate signals between the maintenance-purpose computer and the third electric component control section and the third identification information storing section of any one of the additional third electric components while the maintenance computer communication cable is connected between the interface of the maintenance-purpose computer and the third electric power line connecting section of the one of the additional third electric components.

11. The bicycle electrical system according to claim 10, wherein
the additional third electric components are configured to perform different functions.

12. The bicycle electrical system according to claim 10, wherein
the second electric component has a control unit and an electric power source;
the two-wire electric power lines are configured to transmit control signals and electric power from the second electric component to the first electric component and the third electric components while the first, second, and third electric components are connected together with the two-wire electric power lines via the first, second, and third electric power line connecting sections.

13. The bicycle electrical system according to claim 12, wherein
the signals communicated between the maintenance-purpose computer and the first, second, or third electric component control section of the one of the first, second, and third electric components include at least one of the following: information for upgrading software of the microcomputer of the first, second, or third electric component control section; identification information of the first, second, or third electric component control section; and information indicating a condition of the first, second, or third electric component control section.

14. The bicycle electrical system according to claim 1, wherein
the second electric component has a control unit and an electric power source.

15. The bicycle electrical system according to claim 14, wherein
at least one of the first and the third electric component further includes an electric motor and an inverter.

16. A bicycle electrical system according to claim 14, wherein the control unit receives identification information from the first identification information storage section of the first electric component upon connection of the first electric component, and receives identification information from the third identification information storage section of the third electric component upon connection of the third electric component.

17. The bicycle electrical system according to claim 14, wherein
the two-wire electric power lines are configured to transmit control signals and electric power from the second electric component to the first electric component and third electric component while one of the two-wire electric power lines is connected between the first electric power line connecting section and one of the second electric power line connecting sections and the other of the two-wire electric power lines is connected to between the other of the second electric power line connecting sections and the third electric power line connecting section.

18. The bicycle electrical system according to claim 1, wherein
one of the two wires of each of the two-wire electric power lines is arranged to carry both the control signals and the electric power and the other of the two wires of each of the two-wire electric power lines is arranged to be a ground wire while the two wire electric power line is connected between the first electric power line connecting section and one of the second electric power line connecting sections or between one of the second electric power line connecting sections and the third electric power line connecting section.

19. The bicycle electrical system according to claim 1, wherein
each of the first, second, and third electric component control sections includes a microcomputer.

\* \* \* \* \*